(12) United States Patent
Macgan (10) Patent No.: US 11,851,129 B2
(45) Date of Patent: Dec. 26, 2023

(54) SUSPENSION SYSTEM FOR TWO-WHEELER (71) Applicant: Anoop Ravi Macgan, Bangalore (IN)

(72) Inventor: Anoop Ravi Macgan, Bangalore (IN)

(73) Assignee: Anoop Ravi Macgan

( * ) Notice: Subject to any disclaimer, the term of this patent is extended or adjusted under 35 U.S.C. 154(b) by 79 days.

(21) Appl. No.: 17/612,568

(22) PCT Filed: Jun. 18, 2020

(86) PCT No.: PCT/IB2020/055682
§ 371 (c)(1),
(2) Date: Nov. 19, 2021

(87) PCT Pub. No.: WO2020/254999
PCT Pub. Date: Dec. 24, 2020

(65) Prior Publication Data
US 2022/0242519 A1 Aug. 4, 2022

(30) Foreign Application Priority Data
Jun. 18, 2019 (IN) .............................. 201941024200

(51) Int. Cl.
*B62K 25/20* (2006.01)
*B62K 11/02* (2006.01)

(52) U.S. Cl.
CPC .............. *B62K 25/20* (2013.01); *B62K 11/02* (2013.01)

(58) Field of Classification Search
CPC ................................ B62K 11/02; B62K 25/20
USPC ......................................................... 180/9.26
See application file for complete search history.

(56) References Cited

U.S. PATENT DOCUMENTS

| | | | | |
|---|---|---|---|---|
| 4,058,181 | A * | 11/1977 | Buell | ..................... B62K 25/26 180/227 |
| 2003/0122343 | A1 | 7/2003 | Carlstedt et al. | |
| 2005/0067811 | A1* | 3/2005 | Parigian | ............... B62K 25/286 280/284 |
| 2009/0278331 | A1 | 11/2009 | Graney | |
| 2014/0217697 | A1 | 8/2014 | Buckley | |

* cited by examiner

*Primary Examiner* — Tony H Winner
*Assistant Examiner* — Felicia L. Brittman
(74) *Attorney, Agent, or Firm* — Jason C. Cameron (57) ABSTRACT

A suspension system for two-wheeler vehicle is disclosed. The system includes a rocker arm configured to transmit motion from a wheel to a spring element of a shock absorber using a rocker arm link, a length adjustable unit configured to adjust the length of the rocker arm based on a position of the rocker arm link upon moving a swing arm in up and down direction; to regulate the springing operation of the rear wheel based on the length adjustment of the rocker arm, a shock absorber configured to absorb vibrations.

4 Claims, 9 Drawing Sheets

SUSPENSION SYSTEM FOR TWO-WHEELER

CROSS-REFERENCE TO RELATED APPLICATION

This National Phase Application claims priority from a complete patent application filed in India having Patent Application No. 201941024200, filed on Jun. 18, 2019 and titled "A SUSPENSION SYSTEM FOR TWO-WHEELER".

FIELD OF INVENTION

Embodiments of a present disclosure relate to suspension system, and more particularly to a suspension system for two-wheeler.

BACKGROUND

Suspension is a system to reduce road shocks and vibrations in a vehicle, wherein the suspension is the system of tires, tire air, springs, shock absorber and the linkages which connects a vehicle to the wheels and enables the relative motion between the vehicle and its wheels. At present, the rear suspension system has been used on the two-wheeler to improve the performance of the two-wheeler, wherein the rear suspension system is composed of various components such as springs, linkages and shock absorbers.

However, such suspension system is incapable of providing the provision for manually adjusting the springing operation of the wheel. Also, such suspension system is incapable of providing the facility to a rider to adjust the suspension characteristics of the two-wheeler.

Hence, there is a need for an improved suspension system for two-wheeler in order to address the aforementioned issues.

BRIEF DESCRIPTION

In accordance with an embodiment of the disclosure, a suspension system for two-wheeler is disclosed. The system includes a swing arm. The swing arm includes a first arm spring end operatively coupled to a rear wheel. The swing arm also includes a second swing arm end operatively coupled to a swing arm mounting point using a swing arm pivot. The system also includes a rocker arm configured to transmit force from a wheel to a spring element of a shock absorber using a rocker arm link. The system also includes a length adjustable unit. The length adjustable unit includes the rocker arm link. The rocker arm link includes a first rocker arm link end operatively coupled to the swing arm via rocker arm link mounting point. The rocker arm link also includes a second rocker arm link end operatively coupled to the rocker arm. The length adjustment unit is configured to adjust the length of the rocker arm based on a position of the rocker arm link upon moving the swing arm in up and down direction. The length adjustment unit is also configured to regulate the springing operation of the rear wheel based on the length adjustment of the rocker arm. The system also includes the shock absorber. The shock absorber includes a first shock absorber end operatively coupled to the rocker arm via slide shock mount hole. The shock absorber is configured to absorb vibrations To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
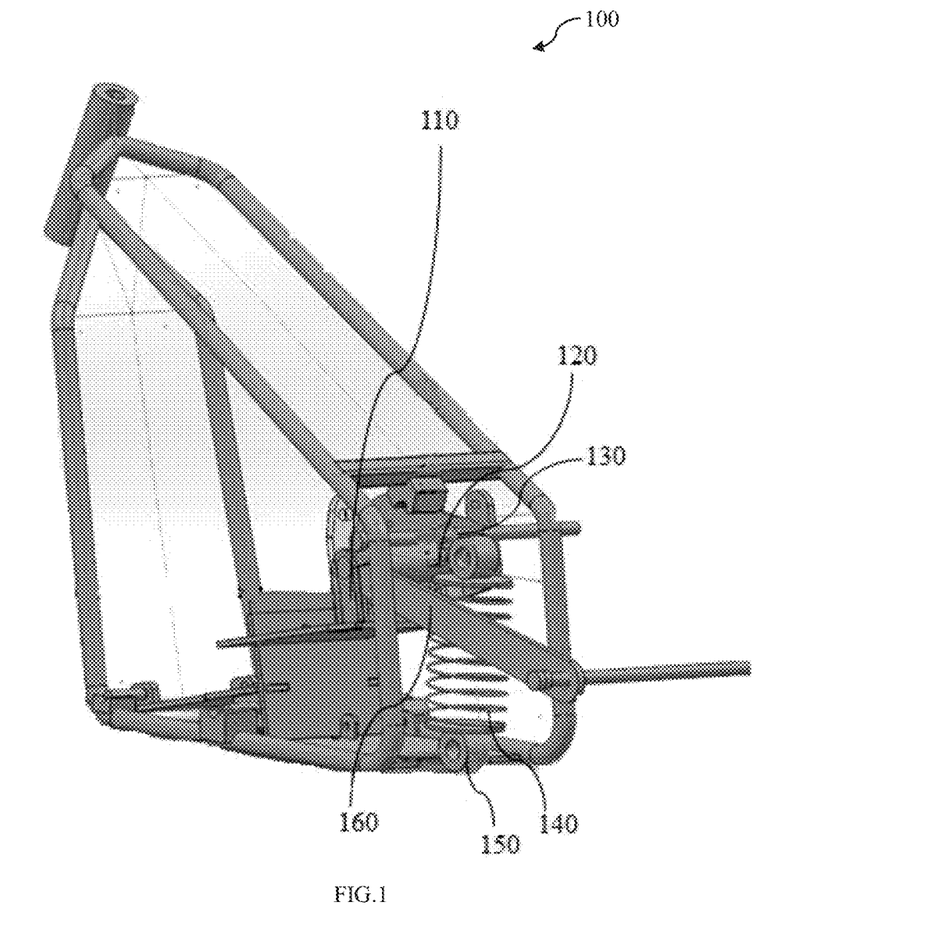
FIG. 1 is a schematic representation of a suspension system for two-wheeler in accordance with an embodiment of the present disclosure.
Figure 6:
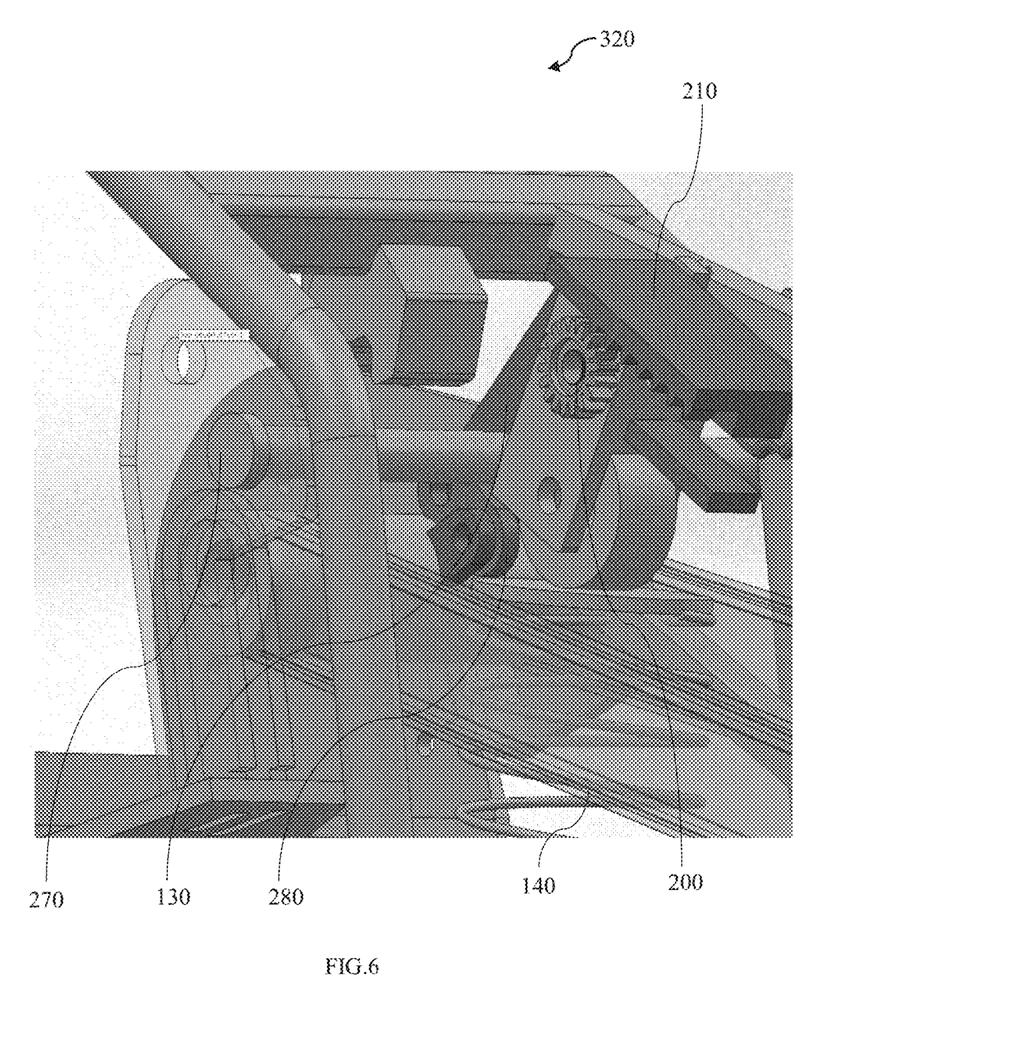
FIG. 6 is another embodiment representing a suspension system for two-wheeler of FIG. 1 in accordance with an embodiment of the present disclosure.
Figure 7:
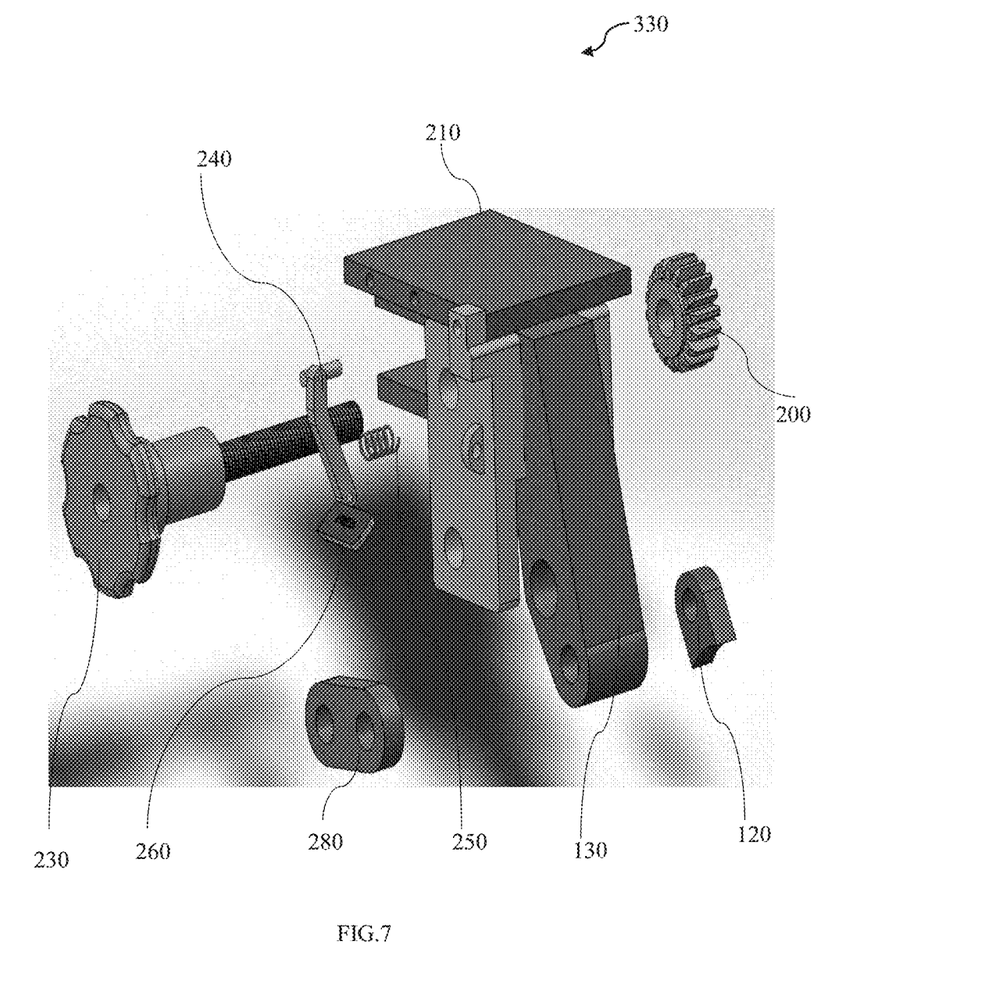
FIG. 7 is yet another exemplary embodiment representing a suspension system for two-wheeler of FIG. 1 in accordance with an embodiment of the present disclosure.
Figure 8:
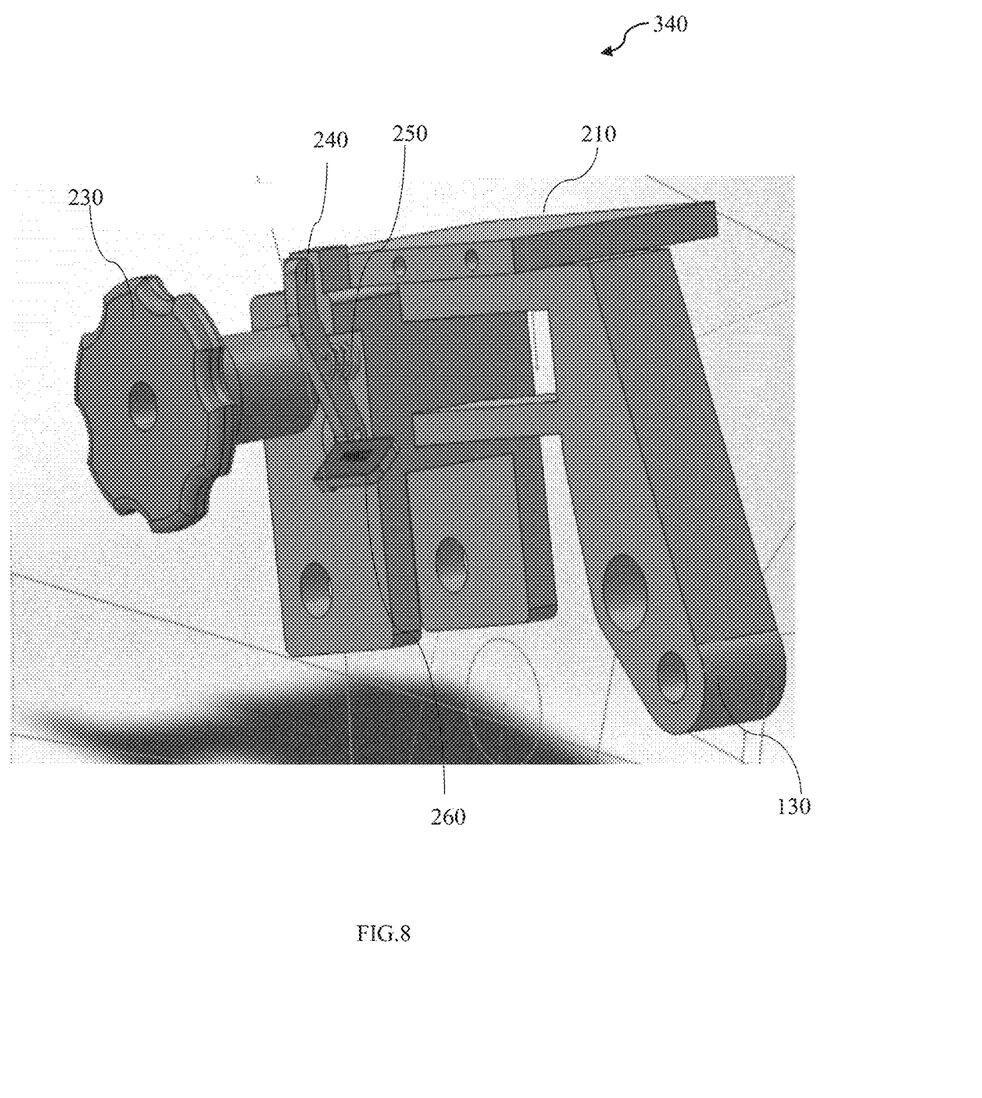
FIG. 8 is an embodiment representing a suspension system for two-wheeler of FIG. 1 in accordance with an embodiment of the present disclosure.
Figure 9:
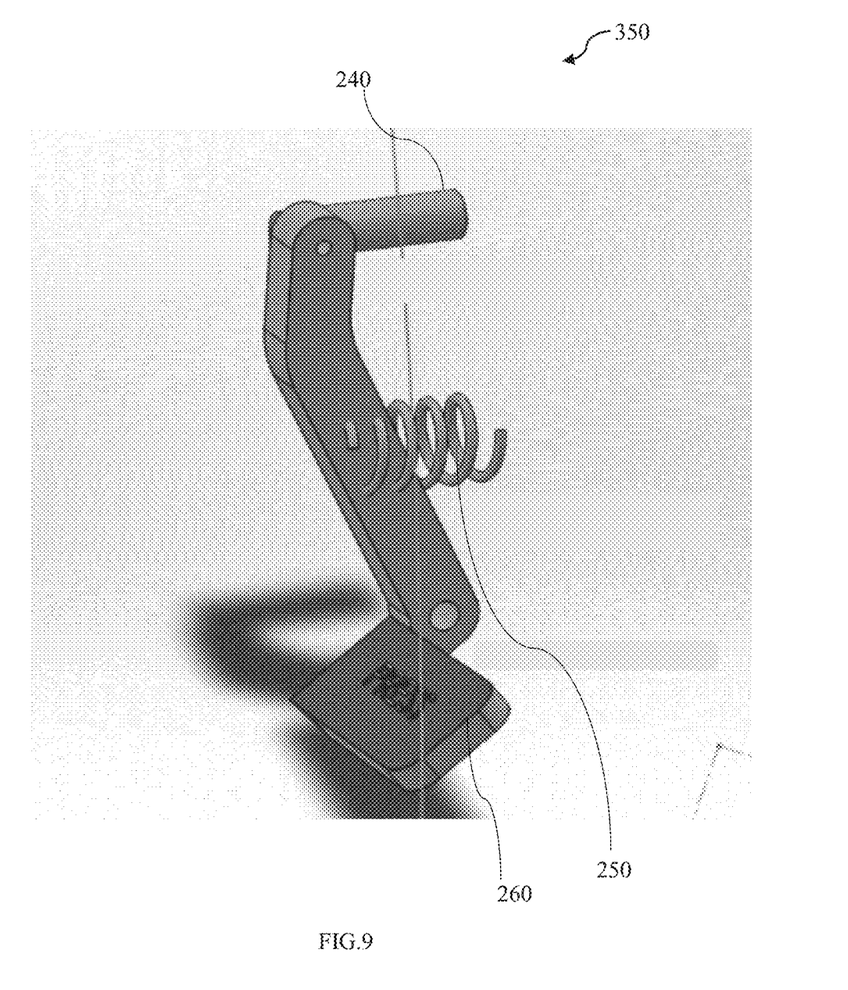
FIG. 9 is another embodiment representing an exploded view of a suspension system for two-wheeler of FIG. 4 in accordance with an embodiment of the present disclosure.

Embodiments of the present disclosure relate to a suspension system for two-wheeler. The system includes a swing arm. The swing arm includes a first arm spring end operatively coupled to a rear wheel. The swing arm also includes a second swing arm end operatively coupled to a swing arm mounting point using a swing arm pivot. The system also includes a rocker arm configured to transmit force from a wheel to a spring element of a shock absorber using a rocker arm link. The system also includes a length adjustable unit. The length adjustable unit includes the rocker arm link. The rocker arm link includes a first rocker arm link end operatively coupled to the swing arm via rocker arm link mounting point. The rocker arm link also includes a second rocker arm link end operatively coupled to the rocker arm. The length adjustment unit is configured to adjust the length of the rocker arm based on a position of the rocker arm link upon moving the swing arm in up and down direction. The length adjustment unit is also configured to regulate the springing operation of the rear wheel based on the length adjustment of the rocker arm. The system also includes the shock absorber. The shock absorber includes a first shock absorber end operatively coupled to the rocker arm via slide shock mount hole. The shock absorber is configured to absorb vibrations FIG. 1 is a schematic representation of a suspension system 100 for two-wheeler. In one embodiment, the system 100 may include a knob 230 (as shown in FIG. 4, FIG. 5, FIG. 7 and FIG. 8) configured to rotate a spur gear 200 (as shown in FIG. 3, FIG. 3, FIG. 3, FIG. 6 and FIG. 7), wherein the spur gear 200 may be configured to move a shock mounting point in a plurality of directions to adjust the shock mounting point in a desired position, wherein the shock mounting point may be operatively coupled to a slider rack gear.

Figure 4:
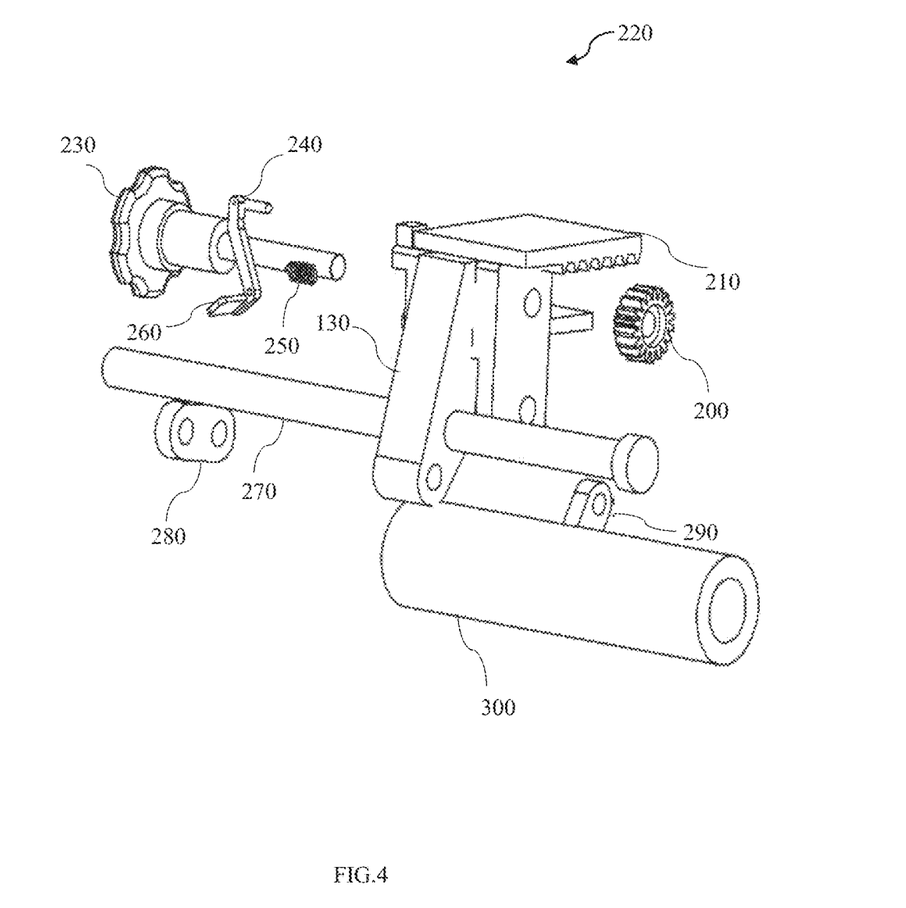
FIG. 4 is yet another embodiment representing an exploded right view of a suspension system for two-wheeler of FIG. 1 in accordance with an embodiment of the present disclosure.
Figure 5:
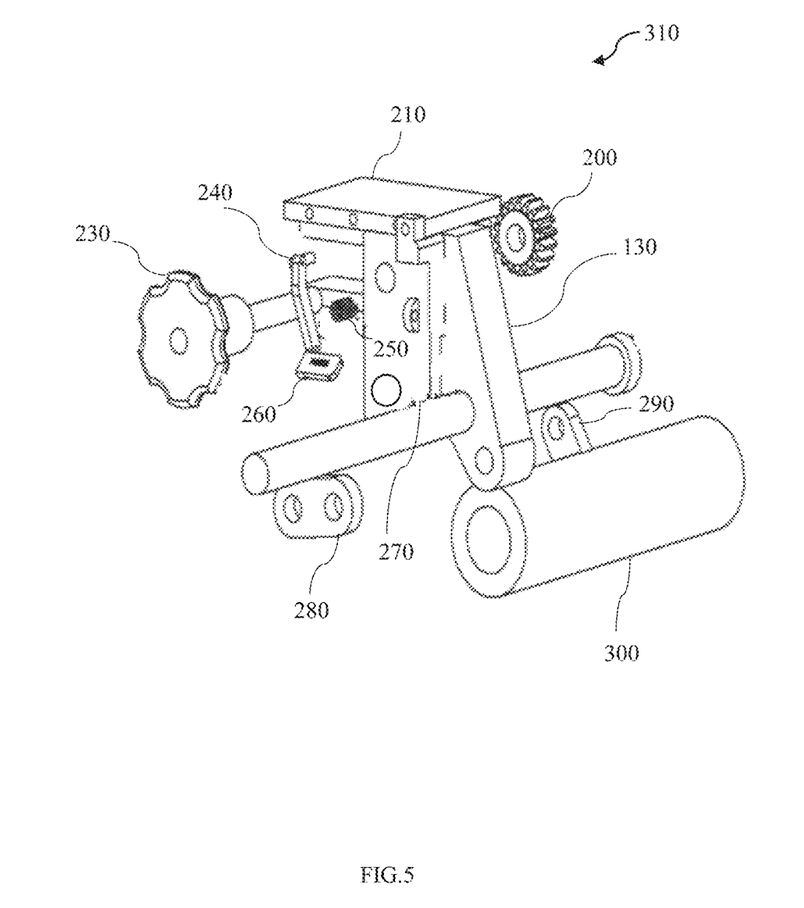
FIG. 5 is an embodiment representing an exploded left view of an of a suspension system for two-wheeler of FIG. 1 in accordance with an embodiment of the present disclosure.

In some embodiment, the system 100 may include a slider pin locking lever 240 (as shown in FIG. 4, FIG. 5, FIG. 7, FIG. 8 and FIG. 9) configured to lock a slider upon adjusting the shock mounting point in the desired position. The system 100 may include a slider locker spring 250 (as shown in FIG. 4, FIG. 5, FIG. 7, FIG. 8 and FIG. 9) configured to keep the slider pin in a locking position. The system 100 may also include a slider lock activation and deactivation lever 260 (as shown in FIG. 4. FIG. 5, FIG. 7, FIG. 8 and FIG. 9) configured to detach the slider pin from a slider body upon pressing the lever.

Figure 2:
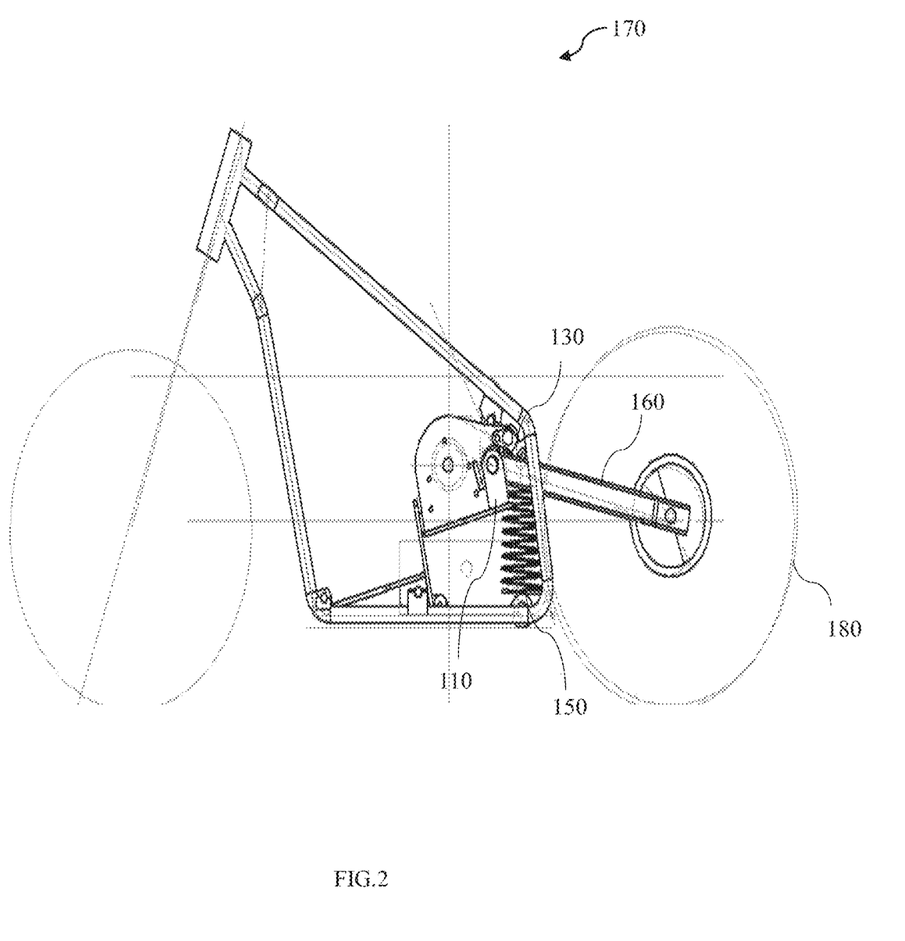
FIG. 2 is an embodiment representing a right view of suspension system for two-wheeler of FIG. 1 in accordance with an embodiment of the present disclosure.
Figure 3:
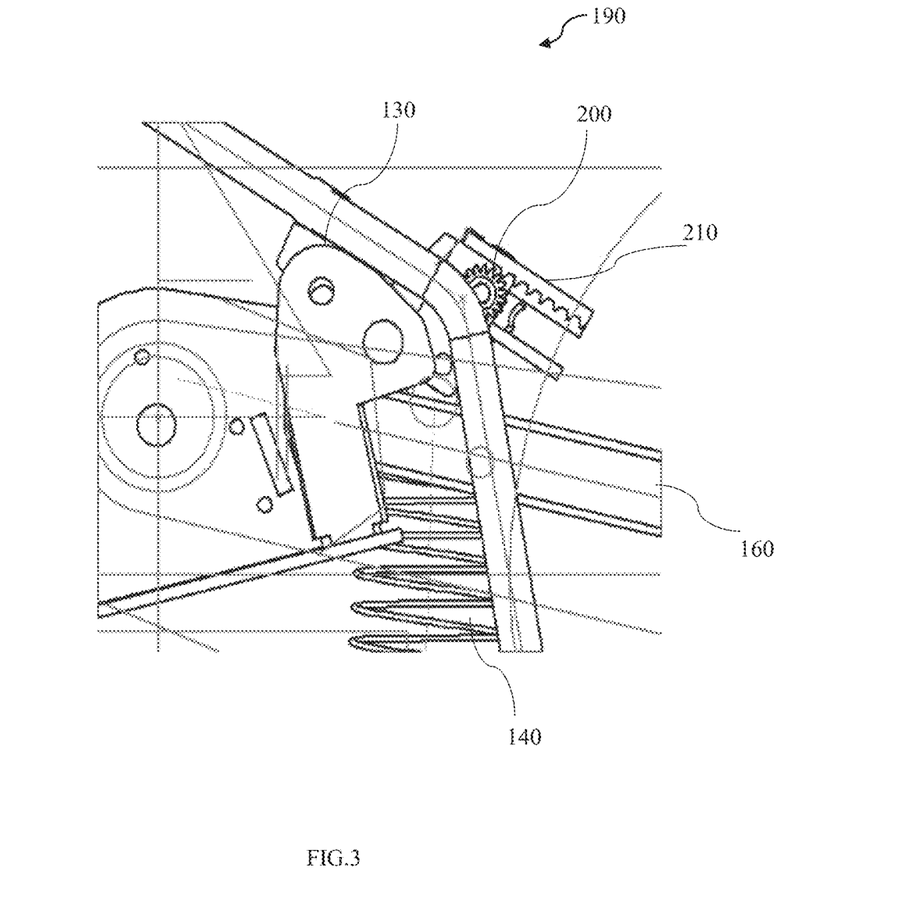
FIG. 3 is another embodiment representing an exploded right view of suspension system for two-wheeler of FIG. 1 in accordance with an embodiment of the present disclosure.

The system 100 also includes a rocker arm 130 (as shown in FIG. 1, FIG. 2, FIG. 3. FIG. 4, FIG. 5, FIG. 6, FIG. 7 and FIG. 8) placed inside the slider body 210 (as shown in FIG. 3, FIG. 4, FIG. 5, FIG. 6, FIG. 7 and FIG. 8). The slider body 210 includes a first slider body end operatively coupled to the shock mounting point with the rocker arm 130, The rocker arm 130 is configured to transmit force from a wheel 180 to a spring element 140 of a shock absorber using a rocker arm link 280. In one embodiment, the rocker arm link 280 may be configured to transfer an upward vertical movement of a swing arm 160 to the rocker arm 130. The slider body 210 also includes a second slider body end operatively coupled to the swing arm 160 via the rocker arm link 280.

The swing arm 160 (as shown in FIG. 1, FIG. 2 and FIG. 3) includes a first arm spring end operatively coupled to a rear wheel 180. The swing arm 160 also includes a second swing arm end operatively coupled to a swing arm mounting point 290 using a swing arm pivot 300. As used herein, the term "swing arm" is a main component of rear suspension and used to hold rear wheel axle to allow the suspensions to absorb vibrations on the road. The slider body 210 also includes a rocker arm pivot axle 270 (as shown in FIG. 4, FIG. 5 and FIG. 6). The rocker arm pivot axle 270 may act as a pivot point for the slider body 210.

The system 100 also includes a length adjustable unit. The length adjustable unit includes the rocker arm link 280 (as shown in FIG. 4, FIG. 5, FIG. 6 and FIG. 7). The rocker arm link 280 includes a first rocker arm link end operatively coupled to the swing arm 160. The rocker arm link 280 also includes a second rocker arm link end operatively coupled to the rocker arm 130.

The length adjustment unit is configured to adjust the length of the rocker arm 130 based on a position of the rocker arm link 280 upon moving the swing arm 160 in up and down direction. The length adjustment unit is also configured to regulate the springing operation of the rear wheel 180 based on the length adjustment of the rocker arm 130.

The system 100 also includes the shock absorber 140 (as shown in FIG. 1, FIG. 2, FIG. 3 and FIG. 6). The shock absorber 140 includes a first shock absorber end operatively coupled to the rocker arm 130 via a slider shock mount hole. The shock absorber is configured to absorb vibrations. In one embodiment, the shock absorber 140 may include a coil spring configured to store and release energy subsequently for shock absorption.

In some embodiment, the rocker arm 130, the rocker arm link 280, the swing arm 160 and the swing arm mounting point 110 may act as a suspended unit.

In operation, in order to regulate the springing operation of the rear wheel 180, a rocker arm 130 contains a movable shock mounting point on one side and a rack gear, wherein a spur gear 200 rotates on the other side of the rocker arm 130 which is in contact with the rack gear upon turning on the knob 230 to enable the user to change the spring load of the shock absorber 140. Also, the rocker arm 130 is connected to swing arm 160 via rocker arm link 280, to enable a rider to adjust the suspension characteristics by twisting the knob 230.

Various embodiments of the present disclosure enable a rider to adjust the suspension characteristics by twisting the knob of a rocker arm. Also, such suspension system provides a facility to regulate the springing operation of the wheel by the length adjusted rocker arm link.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A suspension system for a two-wheeler vehicle comprising:
    a swing arm comprising:
        a first swing arm end operatively coupled to a rear wheel;
        a second swing arm end operatively coupled to a swing arm mounting point using a swing arm pivot;
    a rocker arm configured to transmit force from a wheel to a spring element of a shock absorber using a rocker arm link;
    a length adjustable unit comprises the rocker arm link, wherein the rocker arm link comprises:
        a first rocker arm link end operatively coupled to the swing arm via a rocker arm link mounting point;
        a second rocker arm link end operatively coupled to the rocker arm,
        wherein the length adjustable unit is configured to:
            adjust the length of the rocker arm based on a position of the rocker arm link upon moving the swing arm in an up and down direction;
            regulate the springing operation of the rear wheel based on the length adjustment of the rocker arm; and
    the shock absorber comprises:
        a first shock absorber end operatively coupled to the rocker arm via a slider shock mount hole;
        wherein the shock absorber is configured to absorb vibrations.

2. The system as claimed in claim 1, wherein the rocker arm link is configured to transfer an upward vertical movement of the swing arm to the rocker arm.

3. The system as claimed in claim 1, wherein the shock absorber comprises a coil spring configured to store and release energy subsequently for shock absorption.

4. The system as claimed in claim 1, wherein the rocker arm, the rocker arm link, the swing arm and the swing arm mounting point act as a suspended unit.

* * * * *